(12) United States Patent
Bonnet et al.

(10) Patent No.: US 8,697,214 B2
(45) Date of Patent: *Apr. 15, 2014

(54) MULTI-LAYERED STRUCTURE CONTAINING A BARRIER POLYMER OPTIONALLY REINFORCED AGAINST IMPACTS

(75) Inventors: Anthony Bonnet, Beaumont le Roger (FR); Aude Lapprand, Paris (FR)

(73) Assignee: Arkema France, Colombes (FR)

(*) Notice: Subject to any disclaimer, the term of this patent is extended or adjusted under 35 U.S.C. 154(b) by 750 days.

This patent is subject to a terminal disclaimer.

(21) Appl. No.: 12/513,747

(22) PCT Filed: Nov. 7, 2007

(86) PCT No.: PCT/FR2007/052311
§ 371 (c)(1),
(2), (4) Date: Jan. 5, 2010

(87) PCT Pub. No.: WO2008/056087
PCT Pub. Date: May 15, 2008

(65) Prior Publication Data
US 2010/0112256 A1 May 6, 2010

(30) Foreign Application Priority Data

Nov. 7, 2006 (FR) ..................... 06 54757

(51) Int. Cl.
*B32B 1/08* (2006.01)
*B32B 27/06* (2006.01)
(52) U.S. Cl.
USPC .............. 428/36.91; 428/35.7; 428/421
(58) Field of Classification Search
USPC .............. 428/35.7, 36.9, 36.91, 421
See application file for complete search history.

(56) References Cited

U.S. PATENT DOCUMENTS

| 4,410,595 | A | * | 10/1983 | Matsumoto et al. | .......... 428/412 |
| 5,230,935 | A | * | 7/1993 | Delimoy et al. | ............. 428/36.7 |
| 2003/0198769 | A1 | * | 10/2003 | Jing et al. | .................. 428/36.91 |
| 2005/0058845 | A1 | | 3/2005 | Bellet et al. | |
| 2005/0170122 | A1 | * | 8/2005 | Fahrenholz et al. | ....... 428/36.91 |
| 2006/0057391 | A1 | | 3/2006 | Bonnet et al. | |
| 2008/0317986 | A1 | | 12/2008 | Schmitz et al. | |
| 2009/0026282 | A1 | | 1/2009 | Bonnet et al. | |

FOREIGN PATENT DOCUMENTS

| EP | 1108592 | | 6/2001 | |
| EP | 1637319 | * | 3/2006 | ............. B32B 27/08 |
| FR | 2893696 | | 5/2007 | |
| WO | WO2007060367 | | 5/2007 | |

OTHER PUBLICATIONS

Translation of EP 1 637 319. Mar. 2006.*

* cited by examiner

*Primary Examiner* — Erik Kashnikow
(74) *Attorney, Agent, or Firm* — Thomas F. Roland

(57) ABSTRACT

The invention relates to a multi-layer structure containing from the inside towards the outside: a layer C1 comprising at least one functionalized fluorinated polymer optionally mixed with at least one compatible fluorinated polymer; a layer C2 containing at least one adhesive binder; a layer C3 containing at least one polyolefin, preferably a polyethylene; a layer C4 containing at least one adhesive binder; a barrier layer C5 containing at least one barrier polymer, optionally reinforced against impacts; the layers are arranged against each other in the above mentioned order. The invention also relates to the use of this mull-layered structure for storing or transferring fuel.

12 Claims, No Drawings

MULTI-LAYERED STRUCTURE CONTAINING A BARRIER POLYMER OPTIONALLY REINFORCED AGAINST IMPACTS

This application claims benefit, under U.S.C. §119 or §365 of French Application No. FR 0654757 filed Nov. 7, 2006; and PCT/FR2007/052311 filed Nov. 7, 2007.

FIELD OF THE INVENTION

The invention relates to a multilayer structure comprising a layer made from a barrier polymer and a polyolefin layer that may take the form of a film, pipe, tube, container or tank. In the case of a pipe, tube, container or tank, it may be used to transfer fluids such as a fuel (e.g. a fuel). The barrier polymer may be impact-modified.

THE TECHNICAL PROBLEM

Polyolefins are often used for manufacturing structures such as pipes, tubes or containers, but for many uses they have barrier properties, for example towards a fuel, that are often very inadequate. This is why it is common to combine a polyolefin layer with a layer of a barrier polymer such as EVOH. The polyolefin has a tendency to swell when in contact with a fuel (whether this is in contact with the innermost or outermost layer), which tends to affect the mechanical properties of the structure and also its dimensional stability. The structure must also have low temperature impact strength and retain good mechanical properties at high temperatures.

The Applicant has developed a multilayer structure that solves the problems posed, that is to say in particular that it:
  has good low temperature strength;
  retains good mechanical properties at high temperatures;
  has a low permeability to fuel; and
  retains these properties even in contact with fuel.

THE PRIOR ART

Applications EP 1 537 989 and EP 1 541 343 describe a multilayer structure based on a fluoropolymer onto which an unsaturated monomer has been radiation-grafted. The pipe comprises a modified fluoropolymer layer and a polyolefin layer. There is no mention of EVOH.

Application EP 1 637 319 describes a multilayer structure comprising a barrier polymer layer and a tie layer comprising a polyethylene bearing epoxy functional groups and a viscous polymer. The barrier polymer may be a PVDF onto which an unsaturated monomer has been radiation-grafted. There is no mention of EVOH.

International Application WO 2005/018927 describes a flexible pipe comprising an inner fluoropolymer layer, an intermediate layer made from a thermoplastic polymer such as, for example PE or PA and an outer fluoropolymer layer. An adhesive tie layer may be placed between the fluoropolymer layer or layers and the thermoplastic polymer layer.

BRIEF DESCRIPTION OF THE INVENTION

The invention relates to a multilayer structure comprising a layer of a barrier polymer, that is optionally impact-modified, and a polyolefin layer.

It may be in film, pipe, tube, container or tank form. In the case of a pipe, tube, container or tank, thanks to its barrier properties, it may be used to store or transfer a fuel.

More precisely, the invention concerns a multilayer structure comprising (from the inside towards the outside):
  a layer C1 comprising at least one functionalized fluoropolymer, optionally blended with at least one compatible fluoropolymer;
  a layer C2 comprising at least one adhesive tie;
  a layer C3 comprising at least one polyolefin, preferably a polyethylene;
  a layer C4 comprising at least one adhesive tie; and
  a barrier layer C5 comprising at least one barrier polymer, optionally impact-modified,
the layers being placed against each other in the order indicated.

DETAILED DESCRIPTION OF THE INVENTION

Regarding the polyolefin, this is a polyethylene or a polypropylene. The term polyethylene encompasses ethylene homopolymers and copolymers. It may be, for example, an HDPE, an LLDPE or an LDPE. It could also be a polyethylene obtained by a single-site catalysis (for example of metallocene type), for example an ethylene-octene copolymer of the ENGAGE® type.

The term polypropylene encompasses propylene homopolymers and copolymers. It may be an isotactic or syndiotactic polypropylene. The term polyolefin also encompasses EPR (Ethylene-Propylene Rubber) or EPDM (Ethylene-Propylene-Diene-Monomer) type copolymers.

Preferably, a PE 100 type polyethylene will be chosen for the polyolefin, that is to say a PE which, when it is in the form of a pipe with specific dimensions withstands a test pressure for a period of 5000 hours under vacuum (see standards ISO 1167, ISO 9080 and ISO 12162). A definition of PE 100 can also be found in the International Application WO 2000/060001. This type of PE has indeed a good mechanical strength and a low tendency to swell in the presence of fuel, especially fuel.

Regarding the fluoropolymer, this denotes any polymer having in its chain more than 50%, preferably more than 75%, by weight of at least one fluoromonomer chosen from the compounds containing a vinyl group capable of opening in order to be polymerized and that contains, directly attached to this vinyl group, at least one fluorine atom, one fluoroalkyl group or one fluoroalkoxy group.

As examples of the fluoromonomer, mention may be made of: vinyl fluoride; vinylidene fluoride (VDF, $CH_2=CF_2$); trifluoroethylene ($VF_3$); chlorotrifluoroethylene (CTFE); 1,2-difluoroethylene; tetrafluoroethylene (TFE); hexafluoropropylene (HFP); perfluoro(alkyl vinyl)ethers such as perfluoro(methyl vinyl)ether (PMVE), perfluoro(ethyl vinyl)ether (PEVE) and perfluoro(propyl vinyl)ether (PPVE); perfluoro-1,3-dioxole; perfluoro-2,2-dimethyl-1,3-dioxole (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R_1CH_2OCF=CF_2$ in which $R_1$ is hydrogen or $F(CF_2)_z$ and z is equal to 1, 2, 3 or 4; the product of formula $R_3OCF=CH_2$ in which $R_3$ is $F(CF_2)_z$— and z is 1, 2, 3 or 4; perfluorobutylethylene (PFBE); 3,3,3-trifluoropropene and 2,trifluoromethyl-3,3,3-trifluoroprop-1-ene.

The fluoropolymer may be a homopolymer or a copolymer, it may also comprise unfluorinated monomers such as ethylene or propylene.

By way of example, the fluoropolymer is chosen from:
- homopolymers and copolymers of vinylidene fluoride (PVDF) preferably containing at least 50% by weight of VDF, the copolymer being chosen from chlorotrifluoroethylene (CTFE), hexafluoropropylene (HFP), trifluoroethylene (VF3) and tetrafluoroethylene (TFE);
- ethylene/TFE copolymers (ETFE);
- homopolymers and copolymers of trifluoroethylene (VF3); and
- copolymers, and especially terpolymers, combining the residues of chlorotrifluoroethylene (CTFE), tetrafluoroethylene (TFE), hexafluoropropylene (HFP) and/or ethylene units and optionally VDF and/or VF3 units.

Advantageously, the fluoropolymer is a PVDF homopolymer or copolymer. This is because this fluoropolymer has a good chemical resistance, especially to UV radiation and to chemicals, and it is easily converted by extrusion (more easily than PTFE or ETFE type copolymers). Preferably, the PVDF contains, by weight, at least 50% of VDF, more preferentially at least 75% and even more preferentially at least 85%. The comonomer is advantageously HFP.

Advantageously, the PVDF has a viscosity ranging from 100 Pa·s to 4000 Pa·s, preferably from 300 to 1200 Pa·s, the viscosity being measured at 230° C., at a shear rate of 100 s$^{-1}$ using a capillary rheometer. This is because these PVDFs are well suited to extrusion and injection moulding.

Regarding the functionalized fluoropolymer, this is a fluoropolymer bearing at least one polar group chosen from the following chemical groups: carboxylic acid, carboxylic acid salt, carbonate, carboxylic acid anhydride, epoxide, carboxylic acid ester, silyl, alkoxysilane, carboxylic acid amide, hydroxy and isocyanate. It may be a copolymer comprising at least one fluoromonomer and at least one unsaturated monomer bearing a polar group as is defined. The function of the polar group is to improve the adhesion of the fluoropolymer. The term "functionalized" denotes, more generally in the present application, for a polymer, the fact that this polymer bears a polar group as is defined.

It is possible to obtain the functionalized fluoropolymer by copolymerizing or by grafting an unsaturated polar monomer. The functionalized fluoropolymer may be obtained by copolymerizing at least one fluoromonomer with at least one unsaturated polar monomer (described later on) and optionally with at least one other comonomer. For example, the functionalized polymer may be a PVDF comprising monomer units of VDF and of a monoesterified unsaturated diacid or of vinylene carbonate such as is described in document U.S. Pat. No. 5,415,958. Another example of a functionalized fluoropolymer is that of a PVDF comprising monomer units of VDF and of itaconic or citraconic anhydride such as is described in document U.S. Pat. No. 6,703,465 B2. The functionalized fluoropolymer may be prepared by an emulsion, suspension or solution process.

The functionalized fluoropolymer may also be obtained by radical grafting of at least one unsaturated polar monomer (described later on) onto a fluoropolymer. The grafting may be carried out in that the melt state in the presence of a radical initiator. For example, in International Application WO 2001/081077, Example 5 describes the preparation of an ETFE onto which maleic anhydride is grafted. The grafting is carried out in the melt state at 300° C. in an extruder in the presence of tert-butyl hydroperoxide.

Grafting may also be carried out by irradiation of a blend, in the melt state, of a fluoropolymer and an unsaturated polar monomer. In this case, it will be called, to simplify matters, a radiation-grafted fluoropolymer. The fluoropolymer is first melt-blended with the unsaturated polar monomer. It is possible to use the melt-blending techniques known from the prior art, for example using an extruder or kneader. Preferably, an extruder will be used to convert the blend into granules. Grafting therefore takes place on a blend (in the bulk) and not at the surface of a powder such as is described, for example, in document U.S. Pat. No. 5,576,106.

Next, the blend of the fluoropolymer and of the unsaturated polar monomer is irradiated (beta or gamma radiation) in the solid state using an electron or photon source with a radiation dose between 10 and 200 kGray, preferably between 10 and 150 kGray. The blend may, for example, be packaged in polyethylene bags, the air expelled and then the bags sealed. Advantageously, the dose is between 2 and 6 Mrad and preferably between 3 and 5 Mrad. Irradiation using a cobalt-60 bomb is particularly preferred.

The amount of unsaturated polar monomer that is grafted is between, by weight, 0.1 and 5% (that is to say that the grafted unsaturated polar monomer corresponds to 0.1 to 5 parts per 99.9 to 95 parts of fluoropolymer), advantageously from 0.5 to 5%, preferably from 0.9 to 5%. This amount depends on the initial amount of unsaturated polar monomer in the blend to be irradiated. It also depends on the effectiveness of the grafting, therefore on the duration and the energy of the irradiation.

The unsaturated polar monomer that has not been grafted and also the residues released by the grafting, especially HF, may then be optionally removed. This last step may be made necessary if the ungrafted unsaturated polar monomer is likely to destroy the adhesion or else for toxicology problems. This operation may be carried out according to the techniques known to a person skilled in the art. Vacuum degassing may be applied, optionally at the same time as heating. It is also possible to dissolve the modified fluoropolymer in a suitable solvent such as, for example, N-methylpyrrolidone, then to precipitate the polymer into a non-solvent, for example into water or else into an alcohol, or else to wash the radiation-grafted fluoropolymer using a solvent that is inert towards the fluoropolymer and the grafted functional groups. For example, when maleic anhydride is grafted, it may be washed with chlorobenzene.

This is one of the advantages of this radiation-grafting method, being able to obtain higher contents of grafted unsaturated polar monomer than with the conventional grafting methods using a radical initiator. Thus, typically, with the radiation-grafting method it is possible to obtain contents greater than 1% (1 part of unsaturated monomer per 99 parts of fluoropolymer), even greater than 1.5%, which is not possible with a conventional grafting method in an extruder.

On the other hand, the radiation grafting is carried out "cold", typically at temperatures below 100° C., even below 50° C., so that the blend to be irradiated is not in the melt state as for a conventional grafting method in an extruder. One essential difference is therefore that, in the case of a semicrystalline fluoropolymer (as is the case with PVDF for example), the grafting takes place in the amorphous phase and not in the crystalline phase whereas a homogenous grafting is produced in the case of grafting in an extruder in the melt state. The unsaturated polar monomer is therefore not distributed over the fluoropolymer chains in the same way in the case of radiation grafting as in the case of grafting in an extruder. The radiation-grafted fluorinated product therefore has a different distribution of the unsaturated polar monomer over the fluoropolymer chains relative to a product that would be obtained by grafting in an extruder.

In the blend to be irradiated, the amount of fluoropolymer is, by weight, between 80 and 99.9% per 0.1 to 20% respectively of unsaturated polar monomer. Preferably, the amount of fluoropolymer is from 90 to 99% per 1 to 10% respectively of unsaturated polar monomer.

During this grafting step, it is preferable to avoid the presence of oxygen. Nitrogen or argon flushing of the blend to be irradiated is therefore possible for removing the oxygen. The radiation-grafted fluoropolymer has the very good chemical and oxidation resistance, and also the good thermomechanical behaviour of the fluoropolymer before its modification.

Regarding the functionalized polyolefin, this is preferably a copolymer of ethylene and/or propylene and at least one unsaturated polar monomer. Preferably, the unsaturated polar monomer is chosen from:

$C_1$-$C_8$ alkyl(meth)acrylates, especially methyl, ethyl, propyl, butyl, 2-ethylhexyl, isobutyl or cyclohexyl(meth)acrylates;

unsaturated carboxylic acids, their salts and their anhydrides, especially acrylic acid, methacrylic acid, maleic anhydride, itaconic anhydride or citraconic anhydride;

unsaturated epoxides, especially aliphatic glycidyl esters and ethers such as allyl glycidyl ether, vinyl glycidyl ether, glycidyl maleate and glycidyl itaconate, glycidyl acrylate and glycidyl methacrylate, and also alicyclic glycidyl esters and ethers; and vinyl esters of saturated carboxylic acids, especially vinyl acetate, vinyl propionate or vinyl butyrate.

The term "copolymer" is meant in the broad sense as described, for example, in the IUPAC nomenclature guide by E. S. Wilks or in IUPAC Basic Definitions of Terms Relating to Polymers, Pure Appl. Chem. 40, 477-491 (1974). It also encompasses grafted copolymers.

The functionalized polyolefin may be obtained by copolymerizing ethylene and at least one unsaturated polar monomer chosen from the previous list. The functionalized polyolefin may be a copolymer of ethylene and a polar monomer from the previous list or else a terpolymer of ethylene and of two unsaturated polar monomers chosen from the previous list. The copolymerization is carried out at high pressures greater than 1000 bar according to the process known as the high-pressure process (for example, described in documents FR-A-2498609, EP-A-0 174 244 or EP-A-0 177 378).

The functionalized polyolefin obtained by copolymerization comprises, by weight, from 50 to 99.9% of ethylene, preferably from 60 to 99.9%, even more preferentially from 65 to 99% and from 0.1 to 50%, preferably from 0.1 to 40%, even more preferentially from 1 to 35% of at least one polar monomer from the previous list.

For example, the functionalized polyolefin may comprise ethylene and an unsaturated epoxide, preferably glycidyl (meth)acrylate, and optionally a $C_1$-$C_8$ alkyl(meth)acrylate or a vinyl ester of a saturated carboxylic acid. The content of unsaturated epoxide, especially of glycidyl(meth)acrylate, is between 0.1 and 50%, advantageously between 0.1 and 40%, preferably between 1 and 35%, even more preferentially between 1 and 20%. It could be, for example, functionalized polyolefins sold by Arkema under the references LOTADER AX8840 (8% of glycidyl methacrylate, 92% of ethylene, melt flow index of 5 according to ASTM D1238), LOTADER AX8900 (8% of glycidyl methacrylate, 25% of methyl acrylate, 67% of ethylene, melt flow index of 6 according to ASTM D1238), and LOTADER AX8950 (9% of glycidyl methacrylate, 15% of methyl acrylate, 76% of ethylene, melt flow index of 85 according to ASTM D1238).

The functionalized polyolefin may also comprise ethylene and an unsaturated acid anhydride, preferably maleic anhydride, and optionally a $C_1$-$C_8$ alkyl(meth)acrylate or a vinyl ester of a saturated carboxylic acid. The content of unsaturated acid anhydride, especially of maleic anhydride, is between 0.1 and 50%, advantageously between 0.1 and 40%, preferably between 1 and 35%, even more preferentially between 1 and 10%. It could be, for example, functionalized polyolefins sold by Arkema under the references LOTADER 2210 (2.6% maleic anhydride, 6% butyl acrylate and 91.4% ethylene, melt flow index of 3 according to ASTM D1238), LOTADER 3340 (3% maleic anhydride, 16% butyl acrylate and 81% ethylene, melt flow index of 5 according to ASTM D1238), LOTADER 4720 (0.3% maleic anhydride, 30% ethyl acrylate and 69.7% ethylene, melt flow index of 7 according to ASTM D1238), LOTADER 7500 (2.8% maleic anhydride, 20% butyl acrylate and 77.2% ethylene, melt flow index of 70 according to ASTM D1238), OREVAC 9309, OREVAC 9314, OREVAC 9307Y, OREVAC 9318, OREVAC 9304 or OREVAC 9305.

Functionalized polyolefin also denotes a polyolefin onto which an unsaturated polar monomer from the previous list is grafted by a radical route. The polyolefin is chosen from the previous list. Grafting takes place in an extruder or in solution in the presence of a radical initiator. As examples of radical initiators, the following could also be used: tert-butyl hydroperoxide, cumene hydroperoxide, diisopropylbenzene hydroperoxide, di-tert-butyl peroxide, tert-butylcumyl peroxide, dicumyl peroxide, 1,3-bis(tert-butylperoxyisopropyl) benzene, benzyl peroxide, isobutyryl peroxide, bis(3,5,5-trimethylhexanoyl)peroxide or methyl ethyl ketone peroxide. Grafting of an unsaturated polar monomer onto a polyolefin is known to a person skilled in the art, for more details, reference can be made for example to documents EP 689 505, U.S. Pat. No. 5,235,149, EP 658 139, U.S. Pat. Nos. 6,750,288 B2, 6,528,587 B2. The polyolefin onto which the unsaturated polar monomer is grafted may be a polyethylene, especially high density polyethylene (HDPE) or low density polyethylene (LDPE), linear low density polyethylene (LLDPE), or very low density polyethylene (VLDPE). The polyethylene may be obtained using a Ziegler-Nana or Phillips type catalyst or else a metallocene-type catalyst or even by the high-pressure process. The polyolefin may also be a polypropylene, especially an isotactic or syndiotactic polypropylene. It could for example be functionalized polyolefins sold by Arkema under the references OREVAC 18302, 18334, 18350, 18360, 18365, 18370, 18380, 18707, 18729, 18732, 18750, 18760, PP-C, CA100.

The polymer onto which the unsaturated polar monomer is grafted may also be a copolymer of ethylene and at least one unsaturated polar monomer chosen from:

$C_1$-$C_8$ alkyl(meth)acrylates, especially methyl, ethyl, propyl, butyl, 2-ethylhexyl, isobutyl, or cyclohexyl(meth)acrylates; and vinyl esters of saturated carboxylic acids, especially vinyl acetate or vinyl propionate.

It could for example be functionalized polyolefins sold by Arkema under the references OREVAC 18211, 18216 or 18630.

Regarding the unsaturated polar monomer, this has a C=C double bond and also at least one polar group chosen from the following groups:

carboxylic acid,
carboxylic acid salt,
carboxylic acid anhydride,
epoxide,
carboxylic acid ester,
silyl,
alkoxysilane,
carboxylic acid amide,
hydroxy, and
isocyanate.

Blends of several unsaturated monomers can also be envisaged.

Unsaturated carboxylic acids having from 4 to 10 carbon atoms and their functional derivatives, particularly their anhydrides, are the particularly preferred unsaturated monomers. As examples of unsaturated monomers, mention is made of methacrylic acid, acrylic acid, maleic acid, fumaric acid, itaconic acid, citraconic acid, undecylenic acid, allylsuccinic acid, 4-cyclohexene-1,2-dicarboxylic acid, 4-methyl-4-cyclohexene-1,2-dicarboxylic acid, bicyclo[2.2.1]hept-5-ene-2,3-dicarboxylic acid, x-methylbicyclo[2.2.1]hept-5-ene-2,3-dicarboxylic acid, zinc, calcium or sodium undecylenate, maleic anhydride, itaconic anhydride, citraconic anhydride, dichloromaleic anhydride, difluoromaleic anhydride, crotonic anhydride, glycidyl acrylate or methacrylate, ally glycidyl ether, vinylsilanes such as vinyltrimethoxysilane, vinyltriethoxysilane, vinyltriacetoxysilane and gamma-methacryloxypropyltrimethoxysilane.

Other examples of unsaturated polar monomers include $C_1$-$C_8$ alkyl esters or glycidyl ester derivatives of unsaturated carboxylic acids such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, and diethyl itaconate; amide derivatives of unsaturated carboxylic acids such as acrylamide, methacrylamide, maleamide, malediamide, N-ethylmaleamide, N,N-diethylmaleamide, N-butylmaleamide, N,N-dibutylmaleamide, fumaramide, fumardiamide, N-ethylfiimaramide, N,N-diethylfumaramide, N-butylfumaramide and N,N-dibutylfumaramide; imide derivatives of unsaturated carboxylic acids such as maleimide, N-butylmaleimide and N-phenylmaleimide; and metal salts of unsaturated carboxylic acids such as sodium acrylate, sodium methacrylate, potassium acrylate, potassium methacrylate and zinc, calcium or sodium undecylenate.

Preferably, the unsaturated polar monomer does not have more than one C=C double bond, as this leads to crosslinking of the fluoropolymer. Diacrylates or triacrylates are examples of unsaturated monomers having more than one C=C double bond. From this point of view, maleic anhydride and also the zinc, calcium and sodium undecylenates make good graftable compounds because they have a low tendency to homopolymerize or even to give rise to crosslinking.

Advantageously, maleic anhydride is used. This is because this monomer offers the following advantages:
- it is solid and can easily be introduced with the fluoropolymer granules before the melt blending;
- it enables good adhesion properties to be obtained;
- it is particularly reactive towards many chemical functional groups, especially epoxide or hydroxyl functional groups;
- unlike other unsaturated monomers such as (meth)acrylic acid or acrylic esters, it does not homopolymerize and does not have to be stabilized.

Regarding the barrier polymer, this term denotes a polymer that has a low permeability towards fuels and especially alcoholic fuels. Its permeability is preferably less than 150 g·mm/m²·day for the M15 fuel at 60° C. Examples of barrier polymers are the following:
- polyphenylene sulphide (PPS);
- polybutylene naphthalate (PBN);
- polybutyl terephthalate (PBT);
- EVOH;
- polydimethylketene;
- nylon MDX6; and
- polyglycolic acid (PGA).

Regarding the EVOH, this thus denotes an ethylene-saponified vinyl acetate copolymer comprising from 20 to 70 mol %, advantageously from 25 to 60 mol %, preferably from 25 to 40 mol % of ethylene. Preferably, the degree of saponification of its vinyl acetate component is at least 85% in mols, preferably at least 90%, even more preferentially at least 95%. The ethylene contents and the degree of saponification can be determined, for example, by proton NMR. Advantageously, the EVOH has a melt flow index between 0.5 and 100, preferably between 5 and 30 g/10 min (230° C./2.26 kg). It is understood that the EVOH may contain small amounts of other comonomer ingredients, including α-olefins such as propylene, isobutene, α-octene, unsaturated carboxylic acids or their salts, partial alkyl esters, complete alkyl esters, etc. It is also possible to combine two types of EVOH to improve the barrier and/or mechanical properties.

Regarding the impact-modified barrier polymer, this is a blend comprising at least one barrier polymer and at least one impact modifier. The amount of impact modifier is between, by weight, 1 and 35% per 65 to 99% respectively of barrier polymer. The function of the impact modifier is to increase the impact strength of the barrier polymer. Another function is to make it possible to improve the deformation of the multilayer structure, especially at low temperature. The pipe may thus be deformed without having any cracking, in particular during an impact (e.g. of the type described in the standard UL-971 entitled "Nonmetallic Underground Piping For Flammable Liquids").

A person skilled in the art knows how to choose the impact modifier as a function of the barrier polymer. For example, in the case of EVOH, as was already taught in International Application WO 2005/014282, the impact modifier may be chosen from:
 a) functionalized ethylene/alkyl(meth)acrylate copolymers;
 b) elastomers, preferably EPRs, EPDMs and NBRs, these elastomers possibly being functionalized; and
 c) linear or star S-B-S block copolymers that are optionally hydrogenated (they are then denoted by S-EB-S), these copolymers possibly being functionalized.

Regarding a), the functional groups may be borne by an unsaturated monomer bearing at least one acid, acid anhydride or epoxide functional group. The amount of the unsaturated monomer may be up to 15% by weight of the copolymer and the amount of ethylene at least 50% by weight.

For example, it is a copolymer of ethylene, an alkyl(meth)acrylate and an unsaturated carboxylic anhydride. Preferably, the alkyl(meth)acrylate is such that the alkyl has 2 to 10 carbon atoms. The alkyl(meth)acrylate may be chosen from methyl methacrylate, ethyl acrylate, n-butyl acrylate, isobutyl acrylate or 2-ethylhexyl acrylate. The melt flow index may range, for example, from 0.1 to 50 g/10 min (at 190° C. under 2.16 kg).

For example, it is a copolymer of ethylene, an alkyl(meth)acrylate and an unsaturated epoxide. Preferably, the alkyl (meth)acrylate is such that the alkyl has 2 to 10 carbon atoms. The melt flow index may range, for example, from 0.1 to 50 g/10 min (at 190° C. under 2.16 kg). Examples of the alkyl acrylate or methacrylate that can be used are, in particular, methyl methacrylate, ethyl acrylate, n-butyl acrylate, isobutyl acrylate or 2-ethylhexyl acrylate. Examples of unsaturated epoxides that can be used are in particular:
 aliphatic glycidyl esters and ethers such as allyl glycidyl ether, vinyl glycidyl ether, glycidyl maleate and glycidyl itaconate, glycidyl acrylate and glycidyl methacrylate; and alicyclic glycidyl esters and ethers such as 2-cyclohexene-1-yl glycidyl ether, diglycidyl cyclohexene-4,5-dicarboxylate, glycidyl cyclohexene-4-carboxylate, glycidyl 5-norbornene-2-methyl-2-carboxylate and diglycidyl endocis bicyclo[2.2.1]hept-5-ene-2,3-dicarboxylate.

Regarding c), S-B-S triblocks are described in Ullmann's "Encyclopaedia of Industrial Chemistry", Vol. A26, pages 655-659. As examples of S-B-S triblocks, mention may be made of the linear copolymers in which each block is linked to the other by means of a covalent bond or an intermediate molecule linked to one of the blocks by a covalent bond and to the other block by another covalent bond.

The S block comprises at least 80% of at least one vinyl aromatic compound such as, for example, styrene, α-methylstyrene or vinyltoluene.

The monomer used to synthesize the elastomeric B block may be a diene chosen from butadiene, isoprene, 2,3-dimethyl-1,3-butadiene, 1,3-pentadiene or 2-phenyl-1,3-butadiene. B is advantageously chosen from polydienes, especially polybutadiene, polyisoprene and their random copolymers, or else from partially or completely hydrogenated polydienes. Among the polybutadienes, those whose glass transition temperature ($T_g$) is the lowest are advantageously used, for example poly(1,4-butadiene) having a $T_g$ (around −90° C.) below that of poly(1,2-butadiene) (around 0° C.). The B blocks may also be partially or completely hydrogenated. This hydrogenation is carried out according to the standard techniques. Preferably, the B blocks are mostly made from poly(1,4-butadiene).

The linear S-B-S triblock has a number-average molecular weight which may be between 10 000 g/mol and 500 000 g/mol, preferably between 20 000 and 200 000 g/mol. The S-B-S triblock is advantageously made from a B weight fraction between 5 and 95% and preferably between 15 and 85%.

As another example of S-B-S triblocks, mention may be made of star S-B-S triblocks. The term "triblock" is not in agreement with the number of blocks, but the term "star S-B-S triblocks" is clear to a person skilled in the art. As examples of star triblocks, mention may be made of those of formula:

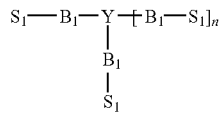

in which n is equal to 1, 2 or 3 and $S_1$ and $B_1$ represent the blocks. The $S_1$ blocks represent polymerized styrene and $B_1$ blocks represent polymerized butadiene, polymerized isoprene or a polymerized blend of butadiene and isoprene. The $B_1$ blocks may be hydrogenated (they are then, for example, S-EB-S). Y denotes a polyfunctional entity resulting, for example, from polyfunctional coupling agents that are used in the manufacture of the star block copolymers. Such agents and also these block copolymers are described in U.S. Pat. No. 3,639,521.

The preferred star block copolymers contain 15 to 45% by weight, and better still 25 to 35%, of styrene units. The molecular weight is at least 140 000 and better still at least 160 000 g/mol.

The particularly preferred star block copolymers are those described in EP 451 920. These copolymers are based on styrene and isoprene, the molecular weight of the polystyrene blocks is at least 12 000 and the polystyrene content is at most 35 wt % of the total weight of the block copolymer.

The preferred linear block copolymers have a molecular weight between 70 000 and 145 000 and contain 12 to 35% by weight of polystyrene. The particularly preferred linear block copolymers are those based on styrene and isoprene described in European Patent EP 451 919. These copolymers have polystyrene blocks with a molecular weight between 14 000 and 16 000 and a polystyrene content between 25 and 35% by weight of the block copolymer. The molecular weight is between 80 000 and 145 000, and better still between 100 000 and 145 000.

It is also possible to use a blend of linear S-B-S triblocks and star S-B-S triblocks. These linear or star S-B-S triblocks are available commercially under the trademarks FINAPRENE®, FINACLEAR®, KRATON® and STYROLUX®.

Examples of EVOH, Whether Impact-modified or not

An example of EVOH that is beneficial for the invention is the grade SOARNOL DC 3203 F sold by Nippon Gohsei. This grade has the following characteristics:
ethylene content (mol %): 32;
melt flow index (210° C./2.16 kg): 3.2 g/10 min;
melting point: 183° C.;
crystallization temperature: 160° C.; and
oxygen permeability: 0.5 cc. 20 μm/m²·day·atm.

An example of impact-modified EVOH is obtained by blending 80% (by weight) of SOARNOL DT 2903 sold by Nippon Gohsei with 20% of maleicized EPR EXXELOR VA 1803 sold by Exxon Mobil Chemicals. SOARNOL DT 2903 has the following characteristics:
ethylene content (mol %): 29;
melt flow index (210° C./2.16 kg): 3.2 g/10 min;
melting point: 188° C.;
crystallization temperature: 163° C.; and
oxygen permeability: 0.4 cc. 20 μm/m²·day·atm.

The mechanical properties of the blend, tested on injection-moulded test pieces, are the following:

| Mechanical property | EVOH | EVOH + mEPR |
|---|---|---|
| Tensile modulus at 23° C. according to ISO-527 (MPa) | 4700 | 2900 |
| Elongation at break at −40° C., 50 mm/min on test pieces according to ISO 527 | 3% | 10% |
| Charpy notched impact strength according to ISO 179 1eA (kJ/m²) | 2 | 14 |

The addition of maleicized EPR makes it possible to reduce the modulus and to increase the low temperature elongation at break and also the impact strength of the EVOH.

Another example of impact-modified EVOH comprises:
an EVOH;
a functionalized impact modifier (content from 1 to 30%), preferably an ethylenepropylene copolymer onto which maleic anhydride has been grafted (mEPR), a polyolefin onto which maleic anhydride has been grafted or else a copolymer of ethylene, ethyl acrylate, and maleic anhydride;
optionally an unfunctionalized polyolefin (E, PP, EPR); and
optionally a polyamide or a copolyamide or blend being finely dispersed in the EVOH (for example PA-6).

Regarding a first embodiment of the multilayer structure, this comprises (from the inside towards the outside):
a layer C1 comprising at least one functionalized fluoropolymer, optionally blended with at least one compatible fluoropolymer;

a layer C2 comprising at least one adhesive tie;
a layer C3 comprising at least one polyolefin, preferably a polyethylene;
a layer C4 comprising at least one adhesive tie; and
a barrier layer C5 comprising at least one barrier polymer, optionally impact-modified, the layers being placed against each other in the order indicated.

Layer C1

The role of C1 is to chemically protect the other layers. C1 also has a barrier function. The amount of functionalized fluoropolymer ranges, by weight, from 1 to 99%, preferably from 50 to 90%, per 99 to 1%, preferably 50 to 10%, of compatible fluoropolymer.

Layer C2

The role of C2 is to promote the adhesion between C1 and C3. Preferably, in order to obtain good adhesion, the adhesive tie from C2 comprises at least one thermoplastic polymer bearing chemical functional groups that react with the unsaturated polar monomer of the functionalized fluoropolymer (hereinafter, to simplify matters, they will be referred to as "reactive chemical functional groups"). For example, if the functionalized fluoropolymer bears acid and/or anhydride functional groups, the polymer of the adhesive tie from C2 may bear epoxide or hydroxy functional groups. Similarly, if the functionalized fluoropolymer bears epoxide and/or hydroxy functional groups, the polymer of the adhesive tie from C2 may bear acid and/or anhydride functional groups.

So that there is good adhesion with C3, the adhesive tie (and therefore especially the thermoplastic polymer) from C2 must also preferably be compatible with the polyolefin. This is why the polymer bearing reactive chemical functional groups is preferably chosen from functionalized polyolefins. By way of example, in the case where the polyolefin from C3 is a polyethylene it is possible to use, for the thermoplastic polymer bearing reactive functional groups, a polyethylene onto which an unsaturated polar monomer has been grafted. It could also be a copolymer of ethylene and an unsaturated polar monomer and optionally an alkyl(meth)acrylate. As another example, if the polyolefin from C3 is a polypropylene, it could be possible to use a polypropylene onto which an unsaturated polar monomer has been grafted.

The polymer bearing reactive chemical functional groups may optionally be blended with a compatible and viscous polyolefin in order to form the adhesive tie from C2. The term "viscous polyolefin" is understood to mean a polyolefin having a melt flow index between 0.1 and 1 g/10 min (190° C./2.16 kg). The Applicant has thus observed that with certain blends, it is possible to obtain a very strong adhesion between C1 and C3 (therefore a peel strength between these layers between 10 and 100 N/cm) and also to avoid the extrusion flaws (e.g. extrusion waviness). An example of such an adhesive tie comprises, by weight, from 1 to 80%, advantageously from 10 to 50%, preferably from 10 to 40% of at least one polymer bearing reactive chemical functional groups and from 99 to 20%, advantageously from 90 to 50%, preferably from 90 to 60% of at least one compatible polyolefin having a flow index between 0.1 and 1 g/10 min (190° C./2.16 kg).

Layer C4

The role of C4 is to promote the adhesion between C3 and C5. The adhesive tie from C4 comprises at least one thermoplastic polymer bearing chemical functional groups that react with the functional groups present on the barrier polymer from C5 and/or optionally with those present on the impact modifier of the barrier polymer from C5. For example, in the case where the barrier polymer is an EVOH, the thermoplastic polymer from C4 may be a polyethylene functionalized by carboxylic acid anhydride groups, preferably maleic anhydride. For example, it could be a polyethylene onto which maleic anhydride has been grafted.

So that there is good adhesion with C3, the adhesive tie from C4 must also preferably be compatible with the polyolefin. This is why the polymer bearing reactive chemical functional groups is preferably chosen from functionalized polyolefins. By way of example, in the case where the polyolefin from C3 is a polyethylene it is possible to use, for the thermoplastic polymer bearing reactive functional groups, a polyethylene onto which an unsaturated polar monomer has been grafted. It could also be a copolymer of ethylene and an unsaturated polar monomer and optionally an alkyl(meth)acrylate. As another example, if the polyolefin from C3 is a polypropylene, it could be possible to use a polypropylene onto which an unsaturated polar monomer has been grafted.

According to a variant of this first embodiment, it is possible to remove C4 if the thermoplastic polymer bearing reactive chemical functional groups is blended with the polyolefin from C3. The multilayer structure then comprises in the order (from the inside towards the outside):
a layer C1 comprising at least one functionalized fluoropolymer, optionally blended with at least one compatible fluoropolymer;
a layer C2 comprising at least one adhesive tie;
a layer C3 comprising at least one polyolefin, preferably a polyethylene, as a blend with a thermoplastic polymer bearing chemical functional groups that react with the functional groups present on the barrier polymer from C5 and/or optionally with those present on the impact modifier of the barrier polymer from C5; and
a barrier layer C5 comprising at least one barrier polymer, optionally impact-modified, the layers being placed against each other in the order indicated.

Preferably, the amount of the thermoplastic polymer varies, by weight, from 0.1 to 50%, advantageously from 1 to 50%, per 99.9 to 50%, advantageously from 99 to 50% respectively of polyolefin.

Regarding a second embodiment of the multilayer structure, this comprises (from the inside towards the outside):
a layer C'1 comprising at least one functionalized fluoropolymer, optionally blended with at least one compatible fluoropolymer;
a barrier layer C'2 comprising at least one barrier polymer, optionally impact-modified;
a layer C'3 comprising at least one polyolefin, preferably a polyethylene, as a blend with a thermoplastic polymer bearing chemical functional groups that react with the functional groups present on the barrier polymer(s) and/or optionally with those present on the impact modifier of the barrier polymer from C'2 and C'4; and
a barrier layer C'4 comprising at least one barrier polymer, optionally impact-modified, the layers being placed against each other in the order indicated.

Layer C'1

This has the same characteristics as those given for C1. The unsaturated polar monomer of the functionalized fluoropolymer reacts with the chemical functional groups of the barrier polymer from C'2 and optionally with those of the impact modifier from C'2.

Layer C'2

The fact of having two barrier layers C'2 and C'4 reduces the overall permeability of the multilayer structure. The deformation resistance of a multilayer structure in pipe form is improved when the barrier polymer from C'2 is impact-modified. The impact strength of the pipe is also improved when the barrier polymer from C'4 is impact-modified.

Preferred Embodiments

According to one preferred embodiment of the first embodiment and its variant and also of the second embodiment:

the functionalized fluoropolymer is a functionalized PVDF;

the fluoropolymer that is optionally blended with the functionalized fluoropolymer is a PVDF;

the polyolefin from C3 or C'3 is a polyethylene;

the adhesive tie from C4 is a thermoplastic polymer bearing chemical functional groups that react with the functional groups present on the barrier polymer from C5 and/or optionally with those present on the impact modifier of the barrier polymer from C5; and the barrier polymer from C5, C'2 and C'4 is an EVOH;

the thermoplastic polymer from C2, C3, C4 and C'3 is a functionalized polyolefin.

Preferably, the functionalized fluoropolymer is a PVDF onto which an acid anhydride, preferably maleic anhydride, has been radiation-grafted. This fluoropolymer extrudes very well and in addition has excellent adhesion. Furthermore, the combination of a PVDF with EVOH makes the multilayer structure a barrier against a large number of molecules, which makes it able to be used for many types of fuels. EVOH also has a good permeability/coextrudability trade-off relative to other barrier polymers (such as for example PPS).

For the two embodiments of the invention and their variants, it is also possible to envisage placing a layer of at least one fluoropolymer against the layer comprising at least one functionalized fluoropolymer. This layer is then the internal layer in contact with the fluid which is stored or transferred.

Examples of Multilayer Structures

One example of a multilayer structure comprises (from the inside towards the outside):

a layer comprising a PVDF onto which maleic anhydride has been radiation-grafted, optionally as a blend with a compatible PVDF;

a layer comprising an adhesive tie;

a layer comprising a polyethylene;

a layer comprising a polyethylene onto which maleic anhydride has been grafted; and a layer comprising an impact-modified EVOH, the layers being placed against each other in the order indicated.

Another example of a multilayer structure comprises (from the inside towards the outside):

a layer comprising a PVDF onto which maleic anhydride has been radiation-grafted, optionally as a blend with a compatible PVDF;

a layer comprising an impact-modified EVOH;

a layer comprising a polyethylene;

a layer comprising a polyethylene onto which maleic anhydride has been grafted; and a layer comprising an impact-modified EVOH, the layers being placed against each other in the order indicated.

The PVDF may be a homopolymer or a copolymer. Preferably, the adhesive tie is a polyethylene bearing chemical functional groups that react with maleic anhydride. It is preferably a polyethylene bearing epoxide functional groups. Preferably, the polyethylene is a PE 100.

According to a third embodiment, the multilayer structure comprises (from the inside towards the outside):

a barrier layer C*1 comprising at least one barrier polymer, optionally impact-modified;

a layer C*2 comprising at least one adhesive tie;

a layer C*3 comprising at least one polyolefin;

a layer C*4 comprising at least one adhesive tie; and a barrier layer C*5 comprising at least one barrier polymer, optionally impact-modified, the layers being placed against each other in the order indicated.

Layer C*1

This has the same characteristics as those described for C1.

Layers C*2 and C*4

The adhesive tie from C*2 and/or C*4 preferably comprises a thermoplastic polymer bearing chemical functional groups that react with those of the barrier polymer and/or optionally those of the impact modifier. The thermoplastic polymer is, in addition, compatible with the polyolefin.

According to one preferred embodiment of the third embodiment:

the barrier polymer is an EVOH; and the thermoplastic polymer from C*2 and C*4 is a functionalized polyolefin.

One example of a multilayer structure comprises (from the inside towards the outside):

a layer comprising an impact-modified EVOH;

a layer comprising a polyethylene onto which maleic anhydride has been grafted;

a layer comprising a polyethylene;

a layer comprising a polyethylene onto which maleic anhydride has been grafted; and a layer comprising an impact-modified EVOH, the layers being placed against each other in the order indicated.

Presence of Additives in the Layers

In all the multilayer structures that have just been described, each of the layers may optionally comprise one or more additives chosen from dyes and/or pigments, antioxidants, UV stabilizers, flame retardants, mineral fillers, etc. In particular, each of the layers may be rendered conductive using a conductive filler that is able to dissipate electrical charges, such as a carbon black or carbon nanotubes. These are more particularly for the layer in contact with the fluid to be transferred or stored. Preferably, the resistivity of the layer that has been rendered conductive is less than $10^6 \Omega \cdot cm$.

Thicknesses of the Layers

Preferably, layers C3 or C'3 or C*3 that comprise the polyolefin have a thickness ranging from 1 to 10 mm so as to provide the structure with an overall rigidity, good mechanical behaviour and also good hydrostatic pressure behaviour. The other layers have a thickness which may range preferably from 25 to 1000 μm.

The multilayer structure may be in the form of a film, pipe, tube, container or tank. The layer in contact with the fluid to be transported or stored is layer C1, C'1 or C*1 or else the fluoropolymer layer that is placed against C1 or C'1. This structure has as permeability less than or equal to 1 g/m²·day according to the standard UL-971.

The multilayer structure and the polymer blends are produced using known techniques for converting plastics. Advantageously, an extruder is used to produce the blends. In order to manufacture a pipe or a tube, the coextrusion technique may be used that relies on the use of as many extruders as there are superposed layers. In the case of a tank or a hollow body, blow moulding of hollow bodies may be used.

Applications

The multilayer structure in pipe, tube, container or tank form has advantageous barrier properties towards various fuels (petrol, diesel, alcoholic petrol, alcohol, etc.) for storing or transferring a fuel. It may be, for example, a tube supplying fuel from the tank to the engine or, in a filling station, a tube supplying fuel from the storage tank to the vehicle or to the fuel pump. The fuel may be a petrol, a diesel or an alcoholic petrol currently produced in certain countries such as Brazil (of the flex-fuel or biodiesel type comprising a high methanol and/or ethanol content).

For safety and environmental protection reasons, automotive manufacturers impose, on pipes for transporting fuel, both mechanical characteristics such as burst strength and flexibility with good low temperature (−40° C.) and high temperature (125° C.) impact strength, and also very low permeability to hydrocarbons and to their additives, in particular alcohols such as methanol and ethanol. These pipes must also have a good resistance to fuels and to engine lubricating oils. Among the characteristics of the specifications, five are particularly difficult to obtain jointly in a simple manner:

- low-temperature (−40° C.) impact strength—the pipe does not break;
- resistance to fuels;
- high-temperature (125° C.) resistance;
- very low permeability to fuel (<1, preferably <0.2 g/m²·day for a pipe having an outside diameter of 50 mm); and
- good dimensional stability of the pipe when using it with fuel.

EXAMPLES

The following products were used:
EVOH: SOARNOL® DT 2903 from Nippon Gohsei.
Impact EVOH: EVOH impact-modified by maleicized EPR. For this EVOH is blended with maleicized EPR using a Werner 40 twin-screw extruder at a temperature of 240° C. (15% EPR).
LOTADER® 8840: copolymer of glycidyl methacrylate (8 wt %) and ethylene (92 wt %), having a melt flow index of 6 (190° C./2.16 kg).
OREVAC® 18334: polyethylene onto which maleic anhydride is grafted, having a melt flow index of 1 (190° C./2.16 kg).
PVDF-1: KYNAR® 720 onto which maleic anhydride has been radiation-grafted (see below), having a melt flow index of 13 (230° C./5 kg), diluted to 30% by weight in ungrafted KYNAR® 720 (70% unmodified KYNAR+30% modified KYNAR).
PVDF-2: KYNAR FLEX® 2750 onto which maleic anhydride has been radiation-grafted (see below), having a flow index of 11 (230° C./5 kg), diluted to 50% in ungrafted KYNAR® 2750 (50% unmodified KYNAR+50% modified KYNAR).
PE-100: sold by Borealis, having a melt flow index of 0.3 (190° C./2.16 kg).
maleicized EPR: EXXELOR® VA 1803 sold by Exxon Mobil Chemicals, having a melt flow index of 3 (230° C./2.16 kg).
M15 fuel: 42.5% toluene+42.5% isooctane+15% methanol;
M85 fuel: 7.5% toluene+7.5% isooctane+85% methanol.

Grafting onto KYNAR® 720 is carried out by first melt-blending the KYNAR® 720 (homopolymer having a melt volume rate of 10 cm³/10 min at 230° C. under 5 kg) with 2 wt % of maleic anhydride. The blend is prepared using a twin-screw extruder at 230° C. and 150 rpm at a throughput of 10 kg/h. After the extrusion step, 1.8% of maleic anhydride remains in the product, the rest being lost during the extrusion step. The product thus prepared is bagged in impermeable aluminium bags. These bags are then irradiated with 3 Mrad using a cobalt bomb. A grafting level of 40% is determined, this level is verified after a solubilization/precipitation step. The PVDF grafted by maleic anhydride is then placed under vacuum overnight at 130° C. in order to evacuate the residual maleic anhydride and the hydrofluoric acid released during the radiation. This product is then diluted by blending 30% of this product with 70% of KYNAR® 720, thus the PVDF-1 is obtained.

Grafting onto KYNAR FLEX® 2750 is carried out by first melt-blending the KYNAR® 2750 (homopolymer having a melt volume rate of 10 cm³/10 min at 230° C. under 5 kg) with 2 wt % of maleic anhydride. The blend is prepared using a twin-screw extruder at 230° C. and 150 rpm at a throughput of 10 kg/h. After the extrusion step, 1.95% of maleic anhydride remains in the product, the rest being lost during the extrusion step. The product thus prepared is bagged in impermeable aluminium bags. These bags are then irradiated with 2 Mrad using a cobalt bomb. A grafting level of 40% is determined, this level is verified after a solubilization/precipitation step. The KYNAR FLEX® grafted by maleic anhydride is then placed under vacuum overnight at 130° C. in order to evacuate the residual maleic anhydride and the hydrofluoric acid released during the radiation. This product is then diluted by blending 50% of this product with 50% of KYNAR FLEX® 2750, thus the PVDF-2 is obtained.

Example 1

5-Layer Structure According to the First Embodiment

On a McNeil type extruder, a 5-layer pipe was coextruded having an outside diameter of 50 mm and an inside diameter of 40 mm. The 5 layers were the following, with from the inside towards the outside:

PVDF-1 (300 μm);
LOTADER 8840 (50 μm);
PE 100 (4.3 mm);
OREVAC 18334 (50 μm); and
90% EVOH+10% maleicized EPR (300 μm).

This coextrusion was carried out with a head temperature of 240° C. The adhesion measured was greater than 30 N/cm between each of the layers.

The pipe had a permeability to M15 at 28° C. of 0.1 g/m²·day and also a permeability to M85 of 0.08 g/m²·day. This pipe was tested during a drop-weight experiment (height of 1.8 m, −30° C., weight of 0.5 kg), no apparent cracking could be observed although 10 pipes were tested.

Example 2

4-Layer Structure According to the Variant of the First Embodiment

The pipe was produced under the same conditions as for Example 1. The 4 layers were the following, with from the inside towards the outside:

PVDF-1 (300 μm);
LOTADER 8840 (50 μm);
70 wt % PE-100+30 wt % OREVAC 18334 (4.35 mm); and
Impact EVOH (300 μm).

The adhesion measured was greater than 30 N/cm between each of the layers. The pipe had a permeability to M15 at 28° C. of 0.15 g/m²·day and also a permeability to M85 of 0.12 g/m²·day. The pipe was tested during a drop-weight experiment (height of 1.8 m, −30° C., weight of 0.5 kg), no apparent cracking could be observed although 10 pipes were tested.

Example 3

4-Layer Structure According to the Second Embodiment

The pipe was produced under the same conditions as for Example 1. The 4 layers were the following, with from the inside towards the outside:
PVDF-1 (300 μm);
Impact EVOH (300 μm);
70% PE-100+30% OREVAC 18334 (4.2 mm); and
Impact EVOH (300 μm).

The adhesion measured was greater than 30 N/cm between each of the layers. The tube had a permeability to M15 at 28° C. of 0.08 g/m²·day and also a permeability to M85 of 0.05 g/m²·day. This pipe was tested during a drop-weight experiment (height of 1.8 m, −30° C., weight of 0.5 kg), no apparent cracking could be observed although 10 pipes were tested.

Example 4

4-Layer Structure According to the Second Embodiment

The pipe was produced under the same conditions as for Example 1. The 4 layers were the following, with from the inside towards the outside:
PVDF-2 (300 μm);
Impact EVOH (300 μm);
70% PE-100+30% OREVAC 18334 (4.2 mm); and
Impact EVOH (300 μm).

The adhesion measured was greater than 30 N/cm between each of the layers. The tube had a permeability to M15 at 28° C. of 0.12 g/m²·day and also a permeability to M85 of 0.08 g/m²·day. This pipe was tested during a drop-weight experiment (height of 1.8 m, −30° C., weight of 0.5 kg), no apparent cracking could be observed although 10 pipes were tested.

Example 5

5-Layer Structure According to the Third Embodiment

The pipe was produced under the same conditions as for Example 1. The 5 layers were the following, with from the inside towards the outside:
Impact EVOH (300 μm);
OREVAC 18334 (50 μm);
PE-100 (4.3 mm);
OREVAC 18334 (50 μm); and
Impact EVOH (300 μm).

The adhesion measured was greater than 30 N/cm between each of the layers. The pipe had a permeability to M15 at 28° C. of 0.17 g/m²·day and also a permeability to M85 of 0.14 g/m²·day. This pipe was tested during a drop-weight experiment (height of 1.8 m, −30° C., weight of 0.5 kg), no apparent cracking could be observed although 10 pipes were tested.

The invention claimed is:

1. A multi-layer structure, comprising from the inside to the outside:

a) a barrier layer C1 consisting of a functionalized fluoropolymer optionally blended with at least one compatible fluoropolymer;
b) a layer C2 comprising an adhesive tie;
c) a layer C3 comprising at least one polyolefin;
d) optionally a layer C4 comprising at least one adhesive tie; and
e) a barrier layer C5 comprising an impact modified EVOH,
the layers being placed directly against each other in the order indicated, wherein each adhesive tie layer(s) C2 and optional C4, comprises as the only functionalized polyolefin, a polyethylene wherein the only functionalization consists of grafted maleic acid anhydride.

2. The multi-layer structure of claim 1, wherein said polyethylene onto which maleic acid has been grafted is blended with a viscous and compatible polyolefin, wherein said viscous polyolefin has a melt flow index of between 0.1 and 1 g/10 min (190° C/2.16 kg).

3. The multi-layer structure of claim 1, wherein said layer C3 comprises a blend of polyethylene and a thermoplastic polymer bearing chemical functional groups that react with the functional groups present on the barrier polymer from C5 and/or optionally with those present on the impact modifier of the barrier polymer from C5.

4. The multi-layer structure of claim 3, wherein said thermoplastic polymer in C3 is a functionalized polyolefin.

5. The multi-layer structure of claim 1, wherein said functionalized fluoropolymer comprises a functionalized polyrvinylidene fluoride (PVDF) optionally blended with a fluoropolymer comprising PVDF.

6. The multi-layer structure of claim 1, wherein said functionalized fluoropolymer comprises a fluoropolymer onto which at least one unsaturated polar monomer has been radically grafted.

7. The multi-layer structure of claim 6, wherein the unsaturated polar monomer is a carboxylic acid having from 4 to 10 carbon atoms or a functional derivative of a carboxylic acid, preferably an acid anhydride.

8. The multi-layer structure of claim 1, wherein said structure comprises a pipe, tube, container or tank.

9. A multi-layer structure, comprising from the inside to the outside:

a) a barrier layer C1 having a permeability of less than or equal to 1 g/m² day according to standard UL-971, consisting of a functionalized fluoropolymer optionally blended with at least one compatible fluoropolymer,;
b) a second barrier layer C'2, optionally impact modified
c) a layer C'3 comprising at least one polyolefin, comprising as the only functionalized polyolefin, a polyethylene wherein the only functionalization consists of grafted maleic acid anhydride
d) a barrier layer C'4 comprising an impact modified EVOH.

10. The multi-layer structure of claim 9, wherein C'2 comprises an impact modified EVOH.

11. The multi-layer structure of claim 9, wherein said functionalized fluoropolymer from C1 contains an unsaturated polar monomer which can react with a chemical functional group of the balkier polymer from C'2, and optionally with a chemical functional group of the impact modifier from C2.

12. The multi-layer structure of claim 9, wherein said structure comprises a pipe, tube, container or tank.

* * * * *